(12) United States Patent
Yokoyama

(10) Patent No.: US 9,097,550 B2
(45) Date of Patent: Aug. 4, 2015

(54) NAVIGATION DEVICE, SERVER, NAVIGATION METHOD AND PROGRAM

(75) Inventor: Ryu Yokoyama, Saitama (JP)

(73) Assignee: PIONEER CORPORATION, Kanagawa (JP)

( * ) Notice: Subject to any disclaimer, the term of this patent is extended or adjusted under 35 U.S.C. 154(b) by 0 days.

(21) Appl. No.: 14/381,294

(22) PCT Filed: Mar. 7, 2012

(86) PCT No.: PCT/JP2012/055819
§ 371 (c)(1),
(2), (4) Date: Aug. 27, 2014

(87) PCT Pub. No.: WO2013/132615
PCT Pub. Date: Sep. 12, 2013

(65) Prior Publication Data
US 2015/0106013 A1    Apr. 16, 2015

(51) Int. Cl.
*G01C 21/36* (2006.01)
*H04L 29/08* (2006.01)
*G10L 15/30* (2013.01)

(52) U.S. Cl.
CPC ............ *G01C 21/3608* (2013.01); *G10L 15/30* (2013.01); *H04L 67/10* (2013.01)

(58) Field of Classification Search
CPC ..... G01C 21/3608; H04L 67/10; G10L 15/30
USPC ........... 701/522, 537; 704/254, 200, 231, 246
See application file for complete search history.

(56) References Cited

U.S. PATENT DOCUMENTS

| 2003/0050783 | A1* | 3/2003 | Yoshizawa ................. 704/270.1 |
| 2006/0129311 | A1* | 6/2006 | Bauman et al. ............... 701/201 |
| 2009/0150156 | A1* | 6/2009 | Kennewick et al. .......... 704/257 |
| 2015/0088506 | A1* | 3/2015 | Obuchi et al. ................. 704/236 |

FOREIGN PATENT DOCUMENTS

| JP | 07-222248 | 8/1995 |
| JP | 2003-177790 | 6/2003 |
| JP | 2004-170887 | 6/2004 |
| JP | 2010-224301 | 10/2010 |

OTHER PUBLICATIONS

International Search Report dated Apr. 3, 2012 in International Application No. PCT/JP2012/055819.

* cited by examiner

*Primary Examiner* — Mary Cheung
*Assistant Examiner* — Brian P Sweeney
(74) *Attorney, Agent, or Firm* — Young & Thompson

(57) ABSTRACT

When a navigation device receives an input of speech from a user, it transmits data of inputted speech to a server and receives a speech recognition result. If a guide route includes a communication impossible area, the navigation device obtains terminal-use speech recognition data necessary for the navigation device to perform speech recognition from the server before reaching the communication impossible area. Thus, even if the speech is inputted by the user while traveling the communication impossible area, the navigation device can perform the speech recognition by itself by using the terminal-use speech recognition data.

12 Claims, 2 Drawing Sheets

NAVIGATION DEVICE, SERVER, NAVIGATION METHOD AND PROGRAM

TECHNICAL FIELD

The present invention relates to a speech recognition technique in a navigation device.

BACKGROUND TECHNIQUE

There is known a terminal device, such as a smartphone, which has a speech input function. Patent Reference 1 discloses a system in which speech inputted to a portable information terminal is transmitted to a server and the server executes speech recognition processing to return the recognition result to the portable information terminal.

PRECEDING TECHNICAL REFERENCE

Patent Reference

Patent Reference 1: Japanese Patent Application Laid-Open under No. H07-222248

DISCLOSURE OF INVENTION

Problem to be Solved by the Invention

In the system disclosed in Patent Reference 1, when the portable information terminal locates outside the communication area, it cannot connect to the server and cannot recognize the speech input.

The above is an example of the problem to be solved by the present invention. It is an object of the present invention to provide a navigation device capable of executing the speech recognition processing outside the communication area.

Means for Solving the Problem

One invention is a navigation device which performs navigation along a guide route from a predetermined point to a destination, comprising: a speech input unit which receives an input of speech; a transmitting unit which transmits data of inputted speech to a server and requests speech recognition; a receiving unit which receives a speech recognition result of the data of the inputted speech from the server; and an obtaining unit which obtains terminal-use speech recognition data necessary for recognition of the inputted speech from the server, before reaching a communication impossible area where communication with the server is impossible, in a case where the guide route includes the communication impossible area.

Another invention is a navigation method executed by a navigation device which performs navigation along a guide route from a predetermined point to a destination, comprising: a speech input process which receives an input of speech; a transmitting process which transmits data of inputted speech to a server and requests speech recognition; a receiving process which receives a speech recognition result of the data of the inputted speech from the server; and an obtaining process which obtains terminal-use speech recognition data necessary for recognition of the inputted speech from the server, before reaching a communication impossible area where communication with the server is impossible, when the guide route includes the communication impossible area.

Still another invention is a program executed by a navigation device which performs navigation along a guide route from a predetermined point to a destination, the program making the navigation device function as: a speech input unit which receives an input of speech; a transmitting unit which transmits data of inputted speech to a server and requests speech recognition; a receiving unit which receives a speech recognition result of the data of the inputted speech from the server; and an obtaining unit which obtains terminal-use speech recognition data necessary for recognition of the inputted speech from the server, before reaching a communication impossible area where communication with the server is impossible, when the guide route includes the communication impossible area.

Still another invention is a server communicable with a terminal device by wireless communication, comprising: a route search unit which receives a start point and a destination from the terminal device, calculates a guide route from the start point to the destination and transmits the guide route to the terminal device; a storage unit which stores information on a communication impossible area where wireless communication with the terminal device is impossible; and a transmitting unit which transmits terminal-use speech recognition data necessary for the terminal device to perform speech recognition to the terminal device in a case where the calculated guide route includes the communication impossible area.

FORMS TO EXERCISE THE INVENTION

Figure 1:
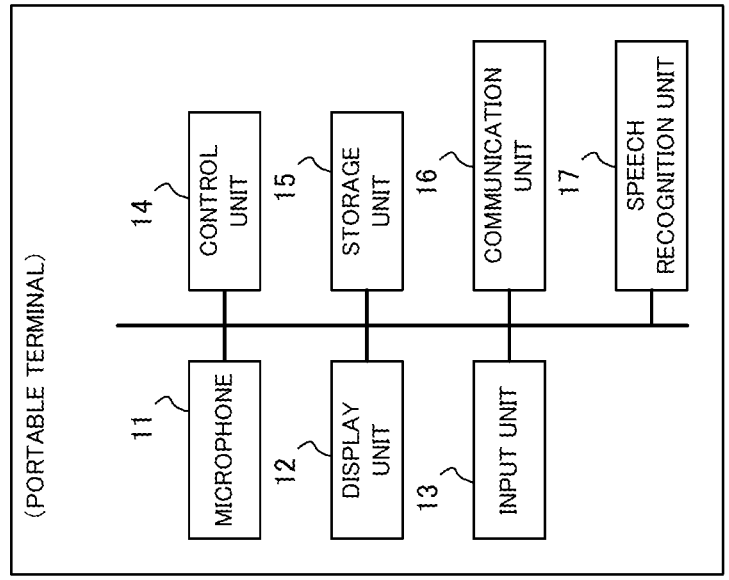
FIG. 1 is a block diagram illustrating configuration of a potable terminal and a server according to an embodiment.
Figure 1:
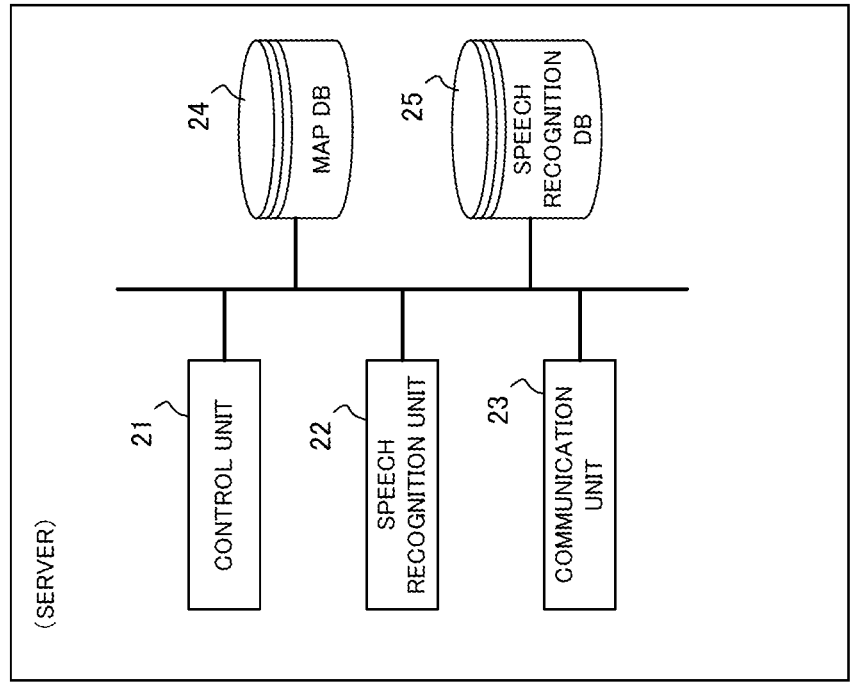

According to one aspect of the present invention, there is provided a navigation device which performs navigation along a guide route from a predetermined point to a destination, comprising: a speech input unit which receives an input of speech; a transmitting unit which transmits data of inputted speech to a server and requests speech recognition; a receiving unit which receives a speech recognition result of the data of the inputted speech from the server; and an obtaining unit which obtains terminal-use speech recognition data necessary for recognition of the inputted speech from the server, before reaching a communication impossible area where communication with the server is impossible, in a case where the guide route includes the communication impossible area.

When the above navigation device receives the input of speech from a user, it transmits data of inputted speech to the server and receives the speech recognition result. If the guide route includes the communication impossible area, the navigation device obtains the terminal-use speech recognition data necessary for the navigation device to perform speech recognition from the server before reaching the communication impossible area. Thus, even if the speech is inputted by the user while traveling the communication impossible area, the navigation device can perform the speech recognition by itself by using the terminal-use speech recognition data.

One mode of the above navigation device further comprises: a speech recognition unit which performs speech recognition of the inputted speech by using the terminal-use speech recognition data; and a point determination unit which determines whether or not a current position belongs to the communication impossible area, wherein the transmitting unit requests the speech recognition to the server in a case where the current position does not belong to the communication impossible area when the speech input unit receives the input of speech, and the speech recognition unit performs the speech recognition by using the terminal-use speech recognition data in a case where the current position belongs to the communication impossible area when the speech input unit receives the input of speech. Thus, the inputted speech can be effective even in an environment where the communication with the server is impossible.

In another mode of the above navigation device, the transmitting unit requests the speech recognition to the server after a communication with the server becomes possible in a case where the speech recognition unit fails in the speech recognition by using the terminal-use speech recognition data and the current position belongs to the communication impossible area. Thus, it is possible to ensure the execution of the speech recognition in response to the input of speech by the user.

Still another mode of the above navigation device further comprises an estimation unit which estimates a necessary time necessary for the current position to enter a communication area from the communication impossible area, wherein the transmitting unit requests the speech recognition to the server after the communication with the server becomes possible in a case where the speech recognition unit fails in the speech recognition by using the terminal-use speech recognition data and the necessary time is shorter than a predetermined time. Thus, it is possible to ensure the execution of the speech recognition in response to the input of speech by the user.

Still another mode of the above navigation device further comprises a storage unit which stores history of words corresponding to the inputted speech to the speech input unit, wherein the obtaining unit requests the terminal-use speech recognition data to the server based on the history of the words stored in the storage unit. In this mode, the speech recognition data only for the frequently used words is obtained, and unnecessary consumption of the storage capacity can be avoided. In a preferred example, the storage unit stores frequency of use of the words as the history, and the obtaining unit requests, to the server, the terminal-use speech recognition data for the words of a predetermined number in an order from a high frequency of use to a low frequency of use.

Still another mode of the above navigation device further comprises an input unit for inputting an operation command, wherein the storage unit stores history of the operation command inputted by the input unit, and wherein the obtaining unit requests the terminal-use speech recognition data to the server based on the history of the operation command stored in the storage unit. In this mode, it is possible to obtain the speech recognition data for not only the inputted speech but also the operation command frequently used by the user inputted by the input unit.

According to another aspect of the present invention, there is provided a navigation method executed by a navigation device which performs navigation along a guide route from a predetermined point to a destination, comprising: a speech input process which receives an input of speech; a transmitting process which transmits data of inputted speech to a server and requests speech recognition; a receiving process which receives a speech recognition result of the data of the inputted speech from the server; and an obtaining process which obtains terminal-use speech recognition data necessary for recognition of the inputted speech from the server, before reaching a communication impossible area where communication with the server is impossible, when the guide route includes the communication impossible area. By this method, the navigation device can perform the speech recognition by itself by using the terminal-use speech recognition data if the speech is inputted by the user while traveling the communication impossible area.

In still another aspect of the present invention, there is provided a program executed by a navigation device which performs navigation along a guide route from a predetermined point to a destination, the program making the navigation device function as: a speech input unit which receives an input of speech; a transmitting unit which transmits data of inputted speech to a server and requests speech recognition; a receiving unit which receives a speech recognition result of the data of the inputted speech from the server; and an obtaining unit which obtains terminal-use speech recognition data necessary for recognition of the inputted speech from the server, before reaching a communication impossible area where communication with the server is impossible, when the guide route includes the communication impossible area. By executing this program, the navigation device can perform the speech recognition by itself by using the terminal-use speech recognition data if the speech is inputted by the user while traveling the communication impossible area. This program can be handled in a manner stored in a storage medium.

In still another aspect of the present invention, there is provided a server communicable with a terminal device by wireless communication, comprising: a route search unit which receives a start point and a destination from the terminal device, calculates a guide route from the start point to the destination and transmits the guide route to the terminal device; a storage unit which stores information on a communication impossible area where wireless communication with the terminal device is impossible; and a transmitting unit which transmits terminal-use speech recognition data necessary for the terminal device to perform speech recognition to the terminal device in a case where the calculated guide route includes the communication impossible area.

According to the above server, when the guide route is calculated in response to the request by the terminal device and the guide route includes the communication impossible area, the terminal-use speech recognition data necessary for the terminal device to perform the speech recognition is transmitted to the terminal device. Therefore, the navigation device can perform the speech recognition by itself by using the terminal-use speech recognition data if the speech is inputted by the user while traveling the communication impossible area.

Embodiments

A preferred embodiment of the present invention will be described below with reference to the attached drawings.

[System Configuration]

FIG. 1 shows a configuration of a system according to the embodiment. As illustrated, the system includes a portable terminal 10 and a server 20. The portable terminal 10 and the server 20 are configured to communicate with each other by wireless communication.

A typical example of the portable terminal 10 is a smartphone, and the portable terminal 10 functions as a navigation device by executing a navigation application. The portable terminal 10 includes a microphone 11, a display unit 12, an input unit 13, a control unit 14, a storage unit 15, a communication unit 16 and a speech recognition unit 17.

The microphone 11 is used for the speech input by a user. The display unit 12 is a liquid crystal display or the like, and displays information of various kinds. Generally, when the portable terminal 10 is executing the navigation application, the display unit 12 displays a map around the current position.

Also, during the route guidance, the display unit 12 displays the guide route from the current position to a destination.

The input unit 13 may be a touch panel, for example, and is used for the operational input by the user. By operating the input unit 13, the user can input selection and/or operation instruction of various kinds.

The control unit 14 may be a CPU, for example, and controls the portable terminal 10 in its entirety. By executing a program prepared in advance, the control unit 14 executes the navigation processing described later.

The storage unit 15 stores information of various kinds. Particularly in this embodiment, the storage unit 13 stores history of operation commands and words inputted by the user in the past. For example, the operation commands include various commands used in the navigation processing, such as "Surrounding Search" and "Route Guidance". In addition, as the words inputted together with those operation commands, genre names of the facilities such as "Convenience Store" and "Gas Station" are stored as the history. The "words" used hereinafter include various words such as the operation commands and the genre name inputted by the user's speech input. The storage unit 15 may store the history of the operation commands and the genre names of the facility, not only inputted by the speech input, but also inputted by the user's operation of the input unit 15.

The communication unit 16 executes wireless communication with the server 20.

The speech recognition unit 17 executes the speech recognition processing on the portable terminal 10 side when the portable terminal 10 is located in a communication impossible area.

On the other hand, the server 20 includes a control unit 21, a speech recognition unit 22, a communication unit 23, a map database (DB) 24 and a speech recognition database (DB) 25.

The control unit 21 may be a CPU, and controls the processing of the server 20 in its entirety. The speech recognition unit 22 executes the speech recognition processing by using data stored in the speech recognition DB 25. Specifically, when the user inputs speech to the microphone 11 of the portable terminal 10, the speech data is transmitted to the server 20. The speech recognition unit 22 analyses the received speech data by using the data for the speech recognition stored in the speech recognition DB 25, and generates and transmits the speech recognition result to the portable terminal 10.

The communication unit 23 performs wireless communication with the portable terminal 10.

The map DB 24 stores map data. In this embodiment, the map data includes information of the communication impossible area. The "communication impossible area" is the area where the wireless communication between the portable terminal 10 and the server 20 is impossible. Specifically, the communication impossible area includes the area outside the mobile communication network. In addition, the communication impossible area includes an area, such as a relatively long tunnel, where the mobile communication becomes impossible for a while.

The speech recognition DB 25 stores data used for the speech recognition processing (hereinafter referred to as "speech recognition data"). Specifically, the speech recognition data includes phoneme data for the words including operation commands of various kinds, and data relevant to the combination of those phoneme data. In this embodiment, the speech recognition method itself is not limited to a specific method. Therefore, various data is stored in the speech recognition DB 25 according to the speech recognition method.

[Navigation Processing]

Figure 2:
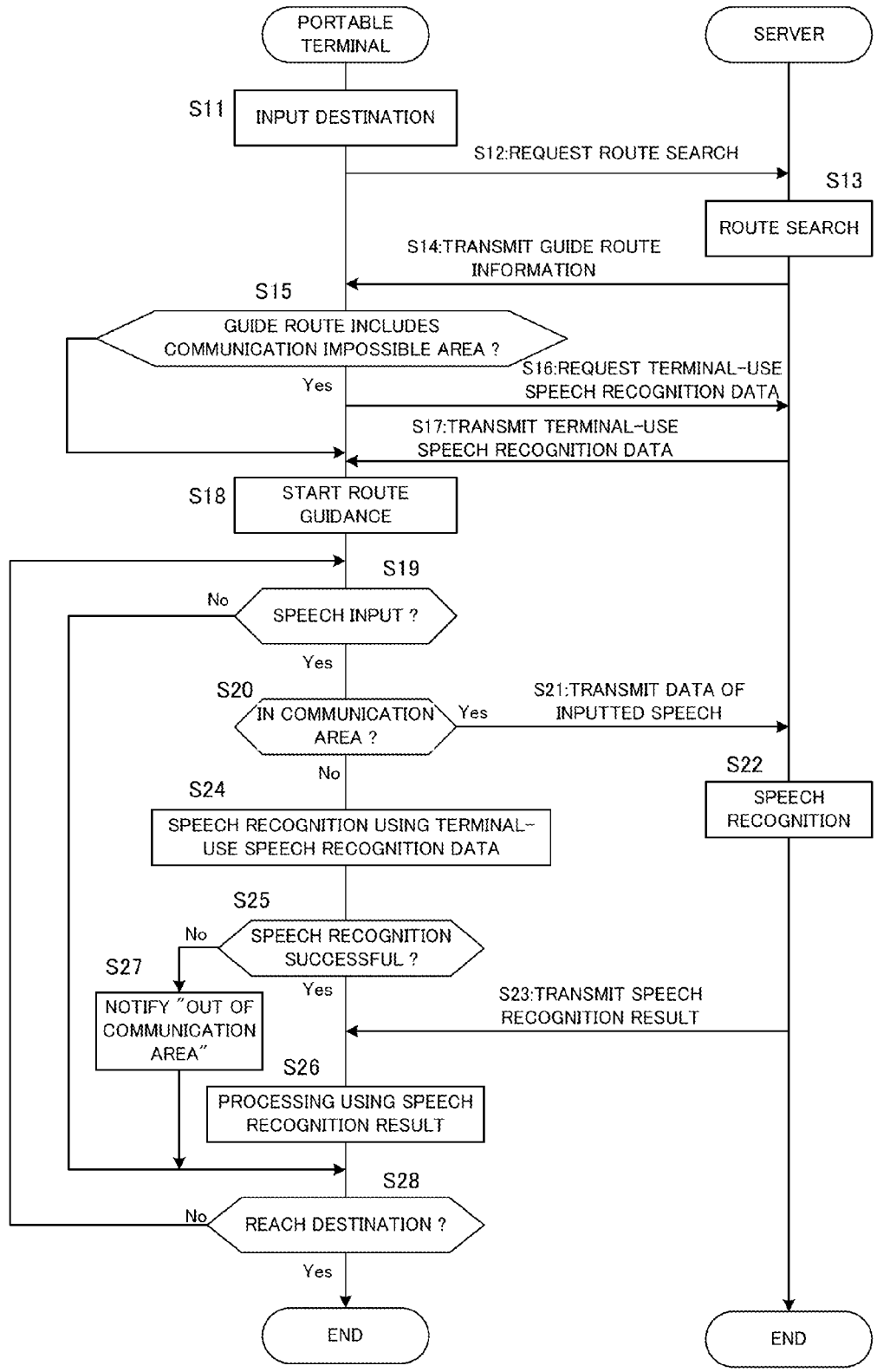
FIG. 2 is a flowchart of navigation processing according to the embodiment.

Next, the navigation processing executed by the portable terminal 10 and the server 20 will be described. FIG. 2 is a flowchart of the navigation processing. This processing is realized by the control unit 14 of the portable terminal 10 and the control unit 21 of the server 20 executing the programs prepared in advance, respectively. Specifically, this navigation processing executes the route guidance to the destination, and recognizes the speech inputted by the user during the route guidance.

First, the user inputs the destination by the input unit 13 of the portable terminal 10, and the portable terminal 10 receives the input (step S11). It is noted that the start point of the route guidance may be inputted by the user together with the destination, or may be set to the current position of the portable terminal 10. When the start point and the destination are decided in this way, the portable terminal 10 requests the route search to the server 20 with designating the start point and the destination (step S12).

When receiving the request of the route search, the control unit 21 of the server 20 searches the guide route from the designated start point to the designated destination by referring to the map DB 24 (step S13), and transmits guide route information including the guide route thus obtained to the portable terminal 10 (step S14). At this time, the server 20 transmits, to the portable terminal 10, the guide route information including information that indicates whether or not the guide route includes the communication impossible area.

Next, the portable terminal 10 determines whether or not the guide route includes the communication impossible area, based on the guide route information received from the server 20 (step S15). When the guide route does not include the communication impossible area (step S15: No), the process goes to step S18. On the contrary, when the guide route includes the communication impossible area (step S15: Yes), the portable terminal 10 requests terminal-use speech recognition data to the server 20 (step S16), and the server 20 generates the terminal-use speech recognition data and transmits it to the portable terminal 10 (step S17).

Here, "the terminal-use speech recognition data" indicates data necessary for the speech recognition unit 17 of the portable terminal 10 to execute the speech recognition, and may be a part of the speech recognition data stored in the speech recognition DB 25, for example. The speech recognition DB 25 in the server 20 stores the speech recognition data for many words. The terminal-use speech recognition data may be the speech recognition data for specific words of those many words.

In this case, when the portable terminal 10 requests the terminal-use speech recognition data to the server 20, it may refer to the history of the words inputted in the past and stored in the storage unit 15 to choose the words that the user frequently uses in the portable terminal 10, and may request only the speech recognition data corresponding to those frequently-used words as the terminal-use speech recognition data. For example, the portable terminal 10 may transmit, to the server 20, a predetermined number of frequently-used words chosen from the words used by the user in the order of the frequency of use, and the server 20 may transmit the speech recognition data for those words to the portable terminal 10 as the terminal-use speech recognition data. In addition, since the history stored in the storage unit 15 in the portable terminal 10 is always updated, the portable terminal 10 may request the terminal-use speech recognition data for the predetermined number of words whose frequency of recent use (e.g., in the last six months) is high.

Further, instead of using the history of the user using the specific portable terminal 10, the history of many users may be used. The server 20 can communicate with many potable terminals 10 and store the statistical information of the words inputted by the speech of many users in the past. Therefore, the server 20 may transmit the speech recognition data for the predetermined number of words whose frequency of use by many users is high to the portable terminal 10 as the terminal-use speech recognition data. In this case, when the portable terminal 10 requests the terminal-use speech recognition data to the server 20, it does not have to transmit the information related to the history stored in the storage unit 15 of its own.

Further, in a case where the speech recognition unit 17 in the portable terminal 10 is configured to perform the speech recognition processing by a method simpler than the speech recognition unit 22 of the server 20, the terminal-use speech recognition data may be data dedicated to the use in such simple speech recognition processing. Namely, the terminal-use speech recognition data that the portable terminal 10 receives from the server 20 is not necessarily the same as the data stored in the speech recognition DB 25 in terms of quantity and content.

Next, the portable terminal 10 starts the route guidance by using the guide route information obtained from the server 20 in step S14 (step S18). In the route guidance, the map around the current position and the guide route to the destination are displayed on the display unit 12.

Next, the portable terminal 10 determines whether or not the speech is inputted by the user during the route guidance (step S19). When the speech is not inputted (step S19: No), the process goes to step S28. On the contrary, when the speech is inputted (step S19: Yes), the portable terminal 10 detects the radio wave condition to determine whether or not the portable terminal 10 itself is in the communication area (step S20).

When the portable terminal 10 is in the communication area (step S20: Yes), it is possible to communicate with the server 20. Therefore, the portable terminal 10 transmits the speech input data to the server 20 to request the speech recognition (step S21). The server 20 refers to the speech recognition DB 25 to execute the speech recognition processing of the speech input data thus received (step S22), and transmits the speech recognition result to the portable terminal 10 (step S23). Then, the portable terminal 10 performs necessary processing by using the speech recognition result thus obtained (step S26). For example, if a specific operation command is obtained as the speech recognition result, the portable terminal 10 executes the processing corresponding to the operation command.

On the contrary, when the portable terminal 10 is not in the communication area (step S20: No), it is not possible to communicate with the server 20. Therefore, the portable terminal 10 performs the speech recognition processing by the speech recognition unit 17 using the terminal-use speech recognition data obtained in step S17 (step S24).

Next, the portable terminal 10 determines whether or not the speech recognition by the speech recognition unit 17 is successful (step S25). As described above, there is a case where the terminal-use speech recognition data is not the same as the data stored in the speech recognition DB 25 of the server 20 and is limited to the speech recognition data corresponding to the words frequently used by the user in the portable terminal 10. Therefore, if the user inputs the speech of the words which are not used so frequently, there is a case that the speech recognition unit 17 cannot recognize the inputted words.

When the speech recognition by the speech recognition unit 17 is successful (step S25: Yes), the portable terminal 10 performs necessary processing by using the obtained speech recognition result (step S26). On the contrary, when the speech recognition by the speech recognition unit 17 is not successful (step S25: No), the portable terminal 10 notifies the user that the portable terminal 10 is "out of the communication area" (step S27).

Next, the portable terminal 10 determines whether or not it has reached the destination (step S28). When the portable terminal 10 have not reached the destination yet (step S28: No), the portable terminal 10 repeats the processing in steps S19 to S26. On the contrary, when the portable terminal 10 have reached the destination (step S28: Yes), it ends the processing.

When the portable terminal 10 have reached the destination, it may delete the terminal-use speech recognition data obtained from the server 20 in step S17 so as to effectively use the storage unit 15 of the portable terminal 10.

As described above, in this embodiment, when the guide route includes the communication impossible area, the portable terminal 10 obtains the terminal-use speech recognition data in advance so as to execute the speech recognition processing on the portable terminal 10 side. After starting the route guidance, the portable terminal 10 requests the speech recognition processing to the server 20 when the speech is inputted in the communication area, but executes the speech recognition processing by using the terminal-use speech recognition data on the portable terminal 10 side when the speech is inputted in the communication impossible area. Thus, the speech recognition becomes possible even in the communication impossible area.

Modified Examples

In the above navigation processing, the server 20 transmits the guide route information including information indicating whether or not the guide route includes the communication impossible area to the portable terminal 10 in step S14, and the portable terminal 10 requests the terminal-use speech recognition data to the server 20, based on the information indicating whether or not the guide route includes the communication impossible area, if the guide route includes the communication impossible area. Instead, if the guide route includes the communication impossible area, the server 20 may transmit the terminal-use speech recognition data to the portable terminal 10 together with the guide route information. In this case, the server 20 may obtain the words frequently used in the portable terminal 10 in advance, and generate and transmit the terminal-use speech recognition data in consideration of those words. Alternatively, the server 20 may generate and transmit the terminal-use speech recognition data for the words generally frequently used in a navigation device based on the history information of many users, without considering the inclination of each of the portable terminals 10.

In the above navigation processing, when the guide route includes the communication impossible area, the portable terminal 10 starts the route guidance after receiving the terminal-use speech recognition data from the server (step S18). Instead, the portable terminal may start the route guidance immediately after receiving the guide route information from the server 20 in step S14 and may request (step S16) and obtain (step S17) the terminal-use speech recognition data during the route guidance. Namely, even when the guide route includes the communication impossible area, there is no problem if the portable terminal 10 can obtain the terminal-use speech recognition data before actually entering the communication impossible area.

In the above navigation processing, when the portable terminal 10 fails the speech recognition in step S15, it notifies the user that current position is out of the communication area and ends the processing for the speech input. Instead, the portable terminal 10 may keep the speech input data to request the speech recognition processing for the speech input data and output the result when the portable terminal 10 enters the communication area and becomes able to communicate with the server 20.

From the current position and the moving speed, it is possible to estimate the time required for the portable terminal 10 to enter the communication area again. When the speech recognition is failed in step S25, if the time required for the portable terminal 10 to enter the communication area again is longer than a predetermined time, the portable terminal 10 may notify the user that the current position is out of the communication area and end the processing for the speech input data. On the contrary, if the time required for the portable terminal to enter the communication area again is shorter than the predetermined time, the portable terminal 10 may keep the speech input data and request the speech recognition processing to the server 20 when the portable terminal 10 enters the communication area again.

While the above embodiment is directed to the case where the present invention is applied to the navigation processing by the portable terminal, the present invention may be applied to an on-vehicle navigation device having a function of communicating with a server and utilizing speech recognition processing by the server. In that case, the processing of the route search may be performed by the server side like the above embodiment or may be performed by the on-vehicle navigation device side by using the map data stored in the on-vehicle navigation device.

INDUSTRIAL APPLICABILITY

This invention can be used for a portable terminal such as a smartphone having a navigation function and an on-vehicle navigation device.

DESCRIPTION OF REFERENCE NUMERALS

10 Portable terminal
11 Microphone
12 Display unit
13 Input unit
14, 21 Control unit
15 Storage unit
16, 23 Communication unit
17, 22 Speech recognition unit
20 Server
24 Map database
25 Speech recognition database

The invention claimed is:

1. A navigation device which performs navigation along a guide route to a destination, comprising:
a speech input unit which receives an input of speech;
a transmitting unit which transmits data of inputted speech to a server;
a receiving unit which receives a speech recognition result of the data of the inputted speech from the server; and
an obtaining unit which obtains terminal-use speech recognition data necessary for recognition of the inputted speech from the server, before reaching a communication impossible area where communication with the server is impossible, in a case where the guide route includes the communication impossible area.

2. The navigation device according to claim 1, further comprising:
a speech recognition unit which performs speech recognition of the inputted speech by using the terminal-use speech recognition data; and
a point determination unit which determines whether or not a current position belongs to the communication impossible area,
wherein the transmitting unit transmits the data of inputted speech to the server in a case where the current position does not belong to the communication impossible area when the speech input unit receives the input of speech, and the speech recognition unit performs the speech recognition by using the terminal-use speech recognition data in a case where the current position belongs to the communication impossible area when the speech input unit receives the input of speech.

3. The navigation device according to claim 2, wherein the transmitting unit transmits the data of inputted speech to the server after communication with the server becomes possible in a case where the speech recognition unit fails in the speech recognition by using the terminal-use speech recognition data and the current position belongs to the communication impossible area.

4. The navigation device according to claim 3, further comprising an estimation unit which estimates a necessary time necessary for the current position to enter a communication area from the communication impossible area,
wherein the transmitting unit transmits the data of inputted speech to the server after the communication with the server becomes possible in a case where the speech recognition unit fails in the speech recognition by using the terminal-use speech recognition data and the necessary time is shorter than a predetermined time.

5. The navigation device according to claim 4, further comprising a storage unit which stores history of words corresponding to the inputted speech to the speech input unit,
wherein the obtaining unit requests the terminal-use speech recognition data to the server based on the history of the words stored in the storage unit.

6. The navigation device according to claim 3, further comprising a storage unit which stores history of words corresponding to the inputted speech to the speech input unit,
wherein the obtaining unit requests the terminal-use speech recognition data to the server based on the history of the words stored in the storage unit.

7. The navigation device according to claim 2, further comprising a storage unit which stores history of words corresponding to the inputted speech to the speech input unit,
wherein the obtaining unit requests the terminal-use speech recognition data to the server based on the history of the words stored in the storage unit.

8. The navigation device according to claim 1, further comprising a storage unit which stores history of words corresponding to the inputted speech to the speech input unit,
wherein the obtaining unit requests the terminal-use speech recognition data to the server based on the history of the words stored in the storage unit.

9. The navigation device according to claim 8,
wherein the storage unit stores frequency of use of the words as the history, and
wherein the obtaining unit requests, to the server, the terminal-use speech recognition data for the words of a predetermined number in an order from a high frequency of use to a low frequency of use.

10. The navigation device according to claim 8, further comprising an input unit for inputting an operation command, wherein the storage unit stores history of the operation command inputted by the input unit, and wherein the obtaining unit requests the terminal-use speech recognition data to the server based on the history of the operation command stored in the storage unit.

11. A navigation method executed by a navigation device which performs navigation along a guide route to a destination, comprising:
   a speech input process which receives an input of speech;
   a transmitting process which transmits data of inputted speech to a server;
   a receiving process which receives a speech recognition result of the data of the inputted speech from the server; and
   an obtaining process which obtains terminal-use speech recognition data necessary for recognition of the inputted speech from the server, before reaching a communication impossible area where communication with the server is impossible, when the guide route includes the communication impossible area.

12. A server communicable with a terminal device by wireless communication, comprising:
   a route search unit which receives a start point and a destination from the terminal device, calculates a guide route from the start point to the destination and transmits the guide route to the terminal device;
   a storage unit which stores information on a communication impossible area where wireless communication with the terminal device is impossible; and
   a transmitting unit which transmits terminal-use speech recognition data necessary for the terminal device to perform speech recognition to the terminal device in a case where the calculated guide route includes the communication impossible area.

* * * * *